US009774905B2

(12) United States Patent
Kim et al.

(10) Patent No.: US 9,774,905 B2
(45) Date of Patent: Sep. 26, 2017

(54) METHOD AND SYSTEM FOR PROVIDING CONTENT SERVICE USING MULTIPLE DEVICES

(75) Inventors: Jun Hyung Kim, Suwon-si (KR); Bo Sun Jung, Suwon-si (KR); Ji Eun Keum, Suwon-si (KR); Ho Yeon Park, Suwon-si (KR); Sung Oh Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 238 days.

(21) Appl. No.: 13/070,764

(22) Filed: Mar. 24, 2011

(65) Prior Publication Data
US 2011/0238724 A1    Sep. 29, 2011

(30) Foreign Application Priority Data

Mar. 25, 2010    (KR) .................... 10-2010-0026615

(51) Int. Cl.
| | | |
|---|---|---|
| *G06F 15/16* | (2006.01) | |
| *H04N 21/436* | (2011.01) | |
| *H04L 12/28* | (2006.01) | |
| *H04N 21/258* | (2011.01) | |
| *H04N 21/658* | (2011.01) | |
| *H04L 12/24* | (2006.01) | |

(52) U.S. Cl.
CPC ... *H04N 21/43615* (2013.01); *H04L 12/2834* (2013.01); *H04L 12/2838* (2013.01); *H04N 21/25816* (2013.01); *H04N 21/6582* (2013.01); *H04L 41/509* (2013.01)

(58) Field of Classification Search
USPC ........................................................ 709/201
See application file for complete search history.

(56) References Cited

U.S. PATENT DOCUMENTS

| | | | | |
|---|---|---|---|---|
| 7,584,497 B2* | 9/2009 | Potrebic | ................ | H04N 5/782 725/116 |
| 7,738,392 B2* | 6/2010 | Walter | ................ | H04L 41/5067 370/252 |
| 2002/0075831 A1* | 6/2002 | Lozano | ................ | H04B 7/2618 370/335 |

(Continued)

FOREIGN PATENT DOCUMENTS

| | | |
|---|---|---|
| JP | 2004-199300 A | 7/2004 |
| KR | 10-2008-0004891 A | 1/2008 |

(Continued)

*Primary Examiner* — Viet Vu
*Assistant Examiner* — James Edwards
(74) *Attorney, Agent, or Firm* — Jefferson IP Law, LLP

(57) ABSTRACT

A method and system for providing a content service such as an Internet Protocol Television (IPTV) using multiple devices are provided. A method, in which a gateway provides a content service using multiple devices, includes sending a service request to a service provider, receiving required list information from the service provider receiving the service request, the required list information indicating a list of devices required for a requested service, acquiring performance information of accessible devices on the basis of the required list information, receiving content with a service level corresponding to the acquired performance information from the service provider, and distributing the received content to the accessible devices to be used for the content service.

19 Claims, 8 Drawing Sheets

(56) References Cited

U.S. PATENT DOCUMENTS

| | | | | |
|---|---|---|---|---|
| 2003/0220872 | A1* | 11/2003 | Chandrashekhar | G06Q 20/102 705/40 |
| 2004/0260798 | A1* | 12/2004 | Addington | H04H 20/78 709/223 |
| 2005/0122389 | A1* | 6/2005 | Miao | H04N 7/152 348/14.01 |
| 2007/0297427 | A1* | 12/2007 | Cho | H04L 12/2854 370/401 |
| 2008/0009319 | A1* | 1/2008 | Kim | H04W 48/08 455/560 |
| 2008/0069006 | A1* | 3/2008 | Walter | H04L 41/5067 370/252 |
| 2008/0281971 | A1* | 11/2008 | Leppanen | H04L 12/1818 709/228 |
| 2009/0028182 | A1* | 1/2009 | Brooks | H04L 41/0896 370/466 |
| 2009/0119699 | A1* | 5/2009 | Crassous | H04N 7/17318 725/25 |
| 2009/0132635 | A1* | 5/2009 | Yoon | H04W 4/02 709/201 |
| 2009/0142036 | A1* | 6/2009 | Branam | H04N 5/44513 386/248 |
| 2009/0248828 | A1* | 10/2009 | Gould | G08B 27/005 709/207 |
| 2010/0036878 | A1* | 2/2010 | Kim | G06F 17/30781 715/716 |
| 2010/0043033 | A1* | 2/2010 | Bagsby | G06Q 30/0613 725/86 |
| 2010/0158476 | A1* | 6/2010 | Hao | H04N 5/782 386/291 |
| 2010/0306379 | A1* | 12/2010 | Ferris | G06F 9/5072 709/226 |
| 2011/0213712 | A1* | 9/2011 | Hadar | G06Q 30/04 705/80 |

FOREIGN PATENT DOCUMENTS

| | | |
|---|---|---|
| KR | 10-2009-0018673 A | 2/2009 |
| KR | 10-2009-0050459 A | 5/2009 |

* cited by examiner

METHOD AND SYSTEM FOR PROVIDING CONTENT SERVICE USING MULTIPLE DEVICES

PRIORITY

This application claims the benefit under 35 U.S.C. §119(a) of a Korean patent application filed on Mar. 25, 2010 in the Korean Intellectual Property Office and assigned Serial No. 10-2010-0026615, the entire disclosure of which is hereby incorporated by reference.

BACKGROUND OF THE INVENTION

1. Field of the Invention

The present invention relates to content service providing technology. More particularly, the present invention relates to a method and system for providing a content service such as an Internet Protocol Television (IPTV) using multiple devices.

2. Description of the Related Art

Nowadays, content services that provide users with various contents such as music, movies, broadcast contents, etc. are becoming increasingly popular. In particular, an IPTV service, which is a broadcast service based on Internet Protocol (IP), is widely utilized as a content service.

With the advent of the IP-based convergence era, converging technology, such as the convergence of communication and broadcast technologies, is arousing customers' interest as a next-generation market-leading technology. More particularly, the IPTV service combines existing TV, voice and data technologies into a united one. This IPTV service based on bi-directionality can allow more and various business models and services to be created.

Normally, modern IPTV service-related technologies are not restricted to specific device environments and network types. Namely, the IPTV service is available for all fixed devices such as a set-top box, a Personal Computer (PC), and a TV, as well as mobile devices such as a cellular phone and a Personal Digital Assistant (PDA). The IPTV service is also available for either of a wired, a wireless, or a broadcast network. Therefore, the IPTV service not only may be applicable to different environments, but also may derive various services from such environments.

When a user requests a service, a service provider can offer an optimal IPTV service that is adapted to a user's device by receiving performance information about the device to be used for the service. For instance, the service provider acquires information about a screen size and resolution of a TV and thereby offers selected content with High-Definition (HD) resolution or Standard-Definition (SD) resolution.

Recently, as services become more diverse and complicated, a certain service may require several devices to provide the service. Therefore, a user who wishes to use such a service should provide the service provider with information about devices to be used for that service. Unfortunately, this causes an inconvenience to the user. Additionally, the user may not know in advance information about devices required for a desired service.

SUMMARY OF THE INVENTION

Aspects of the present invention are to address at least the above-mentioned problems and/or disadvantages and to provide at least the advantages described below. Accordingly, an aspect of the present invention is to allow a content service requiring two or more devices to be provided without user's annoying manipulations.

According to an aspect of the present invention, a method for providing a content service using multiple devices at a gateway is provided. The method includes sending a service request to a service provider, receiving required list information from the service provider receiving the service request, the required list information indicating a list of devices required for a requested service, acquiring performance information of accessible devices on the basis of the required list information, receiving content with a service level corresponding to the acquired performance information from the service provider, and distributing the received content to the accessible devices to be used for the content service.

According to another aspect of the present invention, a method for providing a content service using multiple devices at a service provider is provided. The method includes sending required list information to a gateway in response to a service request of the gateway, the required list information indicating a list of devices required for a requested service, determining a service level of content on the basis of performance information of accessible devices when receiving the performance information from the gateway, and sending the content with the determined service level to the gateway.

According to still another aspect of the present invention, a gateway for providing a content service using multiple devices is provided. The gateway includes a list information reception unit configured to send a service request to a service provider, and to receive required list information from the service provider, the required list information indicating a list of devices required for a requested service, a performance information acquisition unit configured to acquire performance information of accessible devices on the basis of the required list information, and a content distribution unit configured to receive content with a service level corresponding to the acquired performance information from the service provider, and to distribute the received content to the accessible devices to be used for the content service.

According to yet another aspect of the present invention, a service provider for providing a content service using multiple devices is provided. The service provider includes a list information transmission unit configured to send required list information to a gateway in response to a service request of the gateway, the required list information indicating a list of devices required for a requested service, a service level determination unit configured to determine a service level of content on the basis of performance information of accessible devices when receiving the performance information from the gateway, and a content transmission unit configured to send the content with the determined service level to the gateway.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

Figure 1:
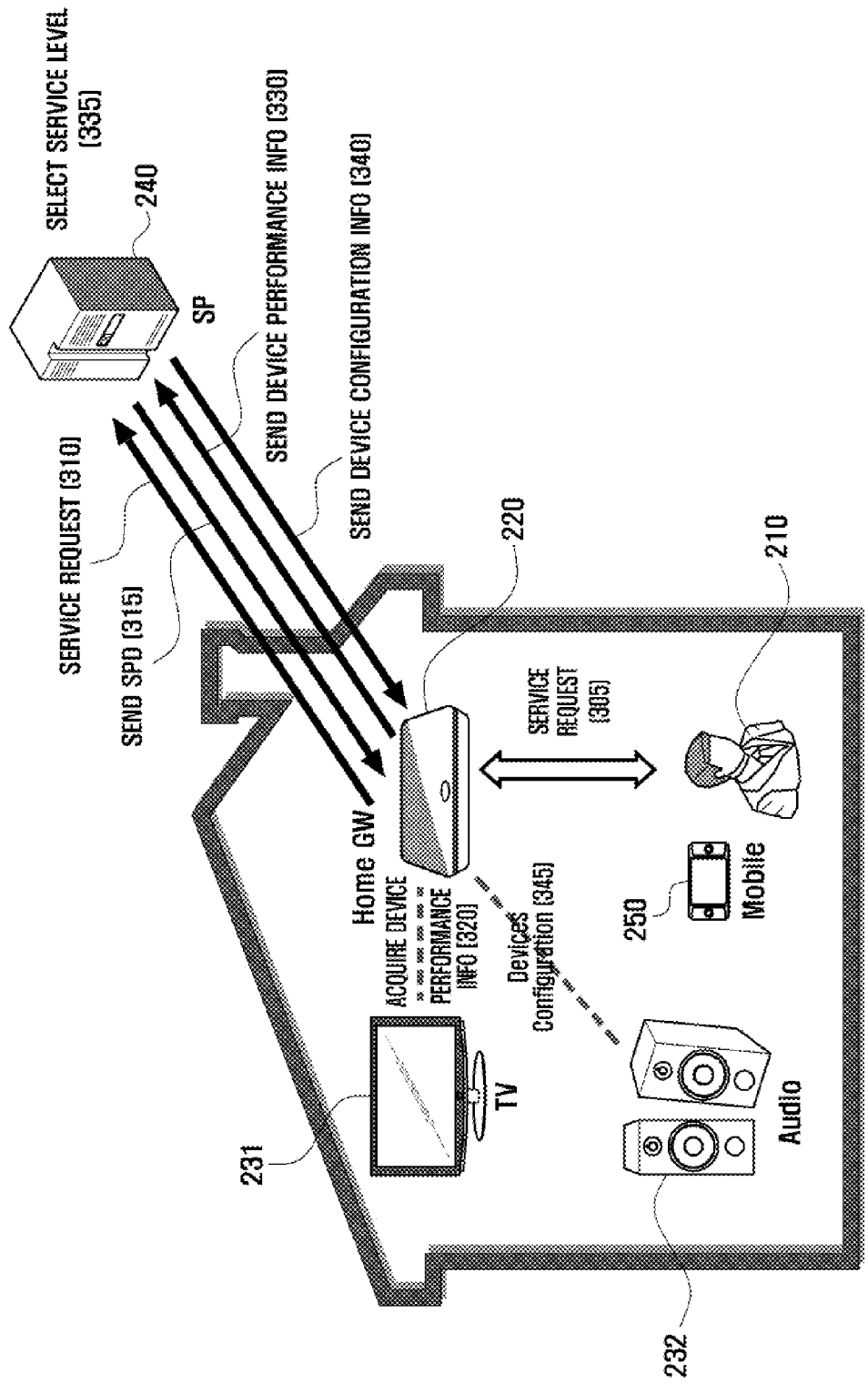
FIG. 1 is a schematic view illustrating the configuration of a system for providing a content service in accordance with an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Table 1 exemplarily shows information contained in a Service Profile Description (SPD) in which a service provider specifies requirements of devices necessary for use of a content service.

TABLE 1

| Service Type | Main Display | Audio | Additional Display | Multiple Host | ... |
|---|---|---|---|---|---|
| Service Type A (e.g. CoD) | Necessary: 1 | Necessary | X | X | |
| Service Type B (e.g. Game) | Necessary: 2 | Necessary | Necessary | X | |
| Service Type C (e.g. Multi-user Game) | Necessary: 1 | Necessary | Necessary | Necessary | |
| Service Type D (e.g. Audio) | X | Necessary | X | X | |
| ... | | | | | |

As shown in Table 1, service types may be classified according to certain factors such as the necessity of main displays, the number of required main displays, support of audio devices, the necessity of additional displays, and the necessity of multiple hosts. Among such factors, multiple hosts are needed in the case where two or more TVs, set-top boxes, Personal Computers (PCs), or the like are used for a single content service. For instance, a multi-user game that allows two or more persons to simultaneously play the same game needs multi hosts. Namely, the SPD may contain list information of devices required for providing a particular service.

Service type A requires a single main display and an audio device without any additional display and without multiple hosts. Content on Demand (CoD) is a typical example of service type A. Service type B requires two or more main displays, an audio device, and an additional display. Typical examples of service type B are a racing game and a flying simulation game. In the case of a flying simulation game, a front view or views of both sides may be offered in a main display, and a rear view or an instrument panel view may be offered in an additional display. Service type C, such as a multi-user game, requires multi hosts, and service type D, such as an audio service, does not require a main display.

Table 2 shows requirements for a content service of service type A in Table 1. These detailed requirements are also contained in the SPD.

TABLE 2

| Service Level | Capability | | | | | | |
|---|---|---|---|---|---|---|---|
| | Video 1 | | Video 2 | Audio | | | |
| (Service A) | Resolution | Access | . | Ch | Access | Broadband | ... |
| Premium | 1280 × 1024 | 802.11g | . | 7.1 ch | 802.11b | FTTH | |
| Superior | 1080 × 960 | 802.11g | . | 5.1 ch | 802.11b | VDSL | |

TABLE 2-continued

| Service | Capability | | | | | |
|---|---|---|---|---|---|---|
| Level | Video 1 | | Video 2 | Audio | | |
| (Service A) | Resolution | Access | Ch | Access | Broadband | ... |
| Standard | 1080 × 960 | 802.11b | . | 2 ch | 802.11b | ADSL |
| Minimum | 800 × 640 | wired | . | 2 ch | wired | Modem |

Table 2 contains information about required performance of devices according to service levels. As mentioned above, service type A requires a single main display and an audio device. Therefore, the required performance information includes information about the first video and audio and may further include network access information supportable by a home network. More specifically, video device information may basically contain screen resolution, a scanning type, inclusion or not of a speaker, a network access type, and the like. Also, audio device information may contain an available channel, a network access type, and the like. Such information may be added or modified according to types and classification criteria of content services offered by a service provider. Depending on classification criteria, service type A may be further divided into service levels. In an example shown in Table 1, service type A is divided into four service levels, premium, superior, standard, and minimum according to resolution. Based on these levels, a service provider may differently manage a billing policy depending on user device performance and user's selection.

Figure 2:
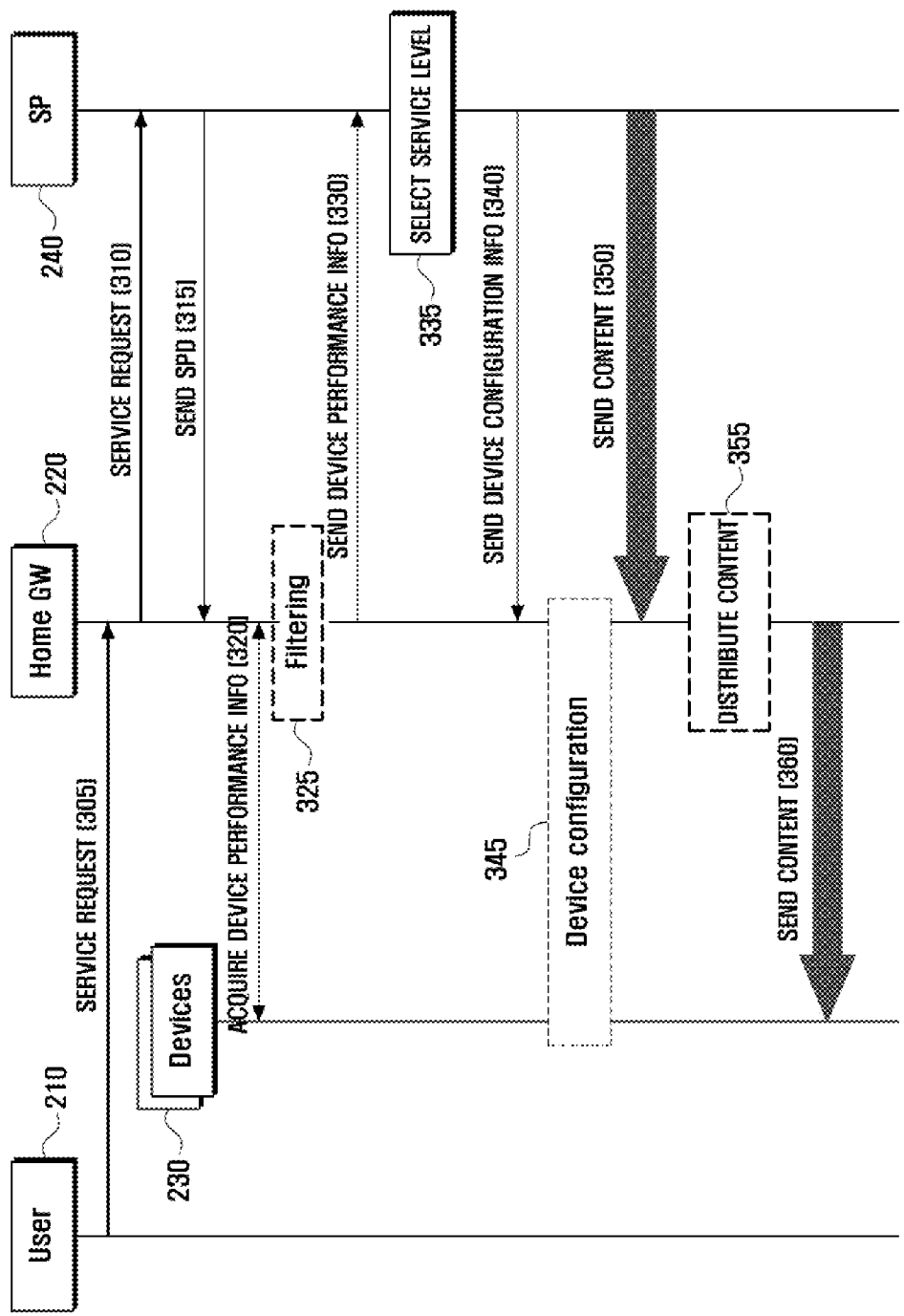
FIG. 2 is a flow diagram illustrating a method for providing a content service in accordance with an exemplary embodiment of the present invention.

FIG. 1 is a schematic view illustrating the configuration of a system for providing a content service in accordance with an exemplary embodiment of the present invention. FIG. 2 is a flow diagram illustrating a method for providing a content service in accordance with an exemplary embodiment of the present invention.

Referring to FIGS. 1 and 2, a content service system includes a service provider 240, a home gateway 220, a TV 231, an audio device 232, and a mobile device 250. Among them, the TV 231 and the audio device 232 are devices allowing the access of the home gateway 220, so these devices will be referred to as accessible devices 230. The home gateway 220 is a kind of gateway.

In step 305, a user 210 makes a request for a content service (e.g., an IPTV service) to the home gateway 220. In this step, the user 210 may directly request a service through a user interface offered by the home gateway 220 or indirectly request a service through the TV 231 or the mobile device 250 connected to the home gateway 220.

In step 310, the home gateway 220 delivers the user's request for an IPTV service to the service provider 240.

In step 315, the service provider 240 that receives the IPTV service request sends its own SPD to the home gateway 220. Since the SPD has been already discussed in Tables 1 and 2, the repetition of the same will be avoided. In some cases, excepting information about performance required according to service level shown in Table 2, only a list of devices required according to service type shown in Table 1 may be transferred to the home gateway 220.

In step 320, the home gateway 220 that receives the SPD determines a service type requested by a user. Additionally, the gateway 220 determines a list of devices required for the requested service type and acquires information about performance of the accessible devices 230. The home gateway 220 may collect in advance the performance information or, whenever the IPTV service is requested, may ask the accessible devices 230 to offer the performance information.

In step 325, the home gateway 220 performs a filtering for the acquired performance information. If there are two or more accessible devices 230 having the same function, the home gateway 220 may select one of them through the filtering. In a case where two or more accessible devices 230 having the same function are needed, for example, when a user requests a service requiring multiple hosts or several main displays, the home gateway 220 may select two or more accessible devices 230 as required. This filtering process is not essential.

In step 330, the home gateway 220 sends the acquired performance information of the accessible devices 230 to the service provider 240.

In step 335, the service provider 240 determines the received performance information of the accessible devices 230 and selects an optimal service level among service levels specified in the SPD. Herein, the optimal service level refers to the highest among service levels that are supportable with the performance information of the accessible devices 230 received from the home gateway 220.

In step 340, the service provider 240 creates information about device configuration required for providing a content service with the selected service level and sends it to the home gateway 220. The device configuration information refers to information indicating which part of content is offered to a user and which of the accessible devices 230 may utilize the content. For instance, if a user requests a content service of service type A in Table 1, the device configuration information indicates that a video part of content is offered to a user and which accessible devices 230 may utilize the video part. The device configuration information also indicates that an audio part of content is offered to a user and which accessible devices 230 may utilize the audio part. If a user requests a content service supporting multiple hosts, the device configuration information may contain information about indicating which host is used. Also, the device configuration information may further contain information indicating which accessible device 230 is used for any purpose. In order to allow content with the selected service level to be offered to a user, the device configuration information may assign each part of content to a proper one of the accessible devices 230 or define a role of each accessible device 230 such as a host.

In step 345, the home gateway 220 sets up the device configuration on the basis of the device configuration information received from the service provider 240.

In step 350, the service provider 240 sends content with a specific level selected in step 335 to the home gateway 220. Based on the device configuration information, the home gateway 220 divides the received content into parts in step 355, and sends the divided parts of content to the respective accessible devices 230 in step 360. For instance, if the home gateway 220 receives content of a service type A and if the device configuration information indicates that video and audio parts are respectively distributed to the TV 231 and the audio device 232, the home gateway 220 divides the received content into the video and audio parts, sends the video part to the TV 231, and sends the audio part to the audio part 232. Therefore, a user can be provided with desired content through the accessible devices 230 such as the TV 231 and the audio device 232.

Figure 3:
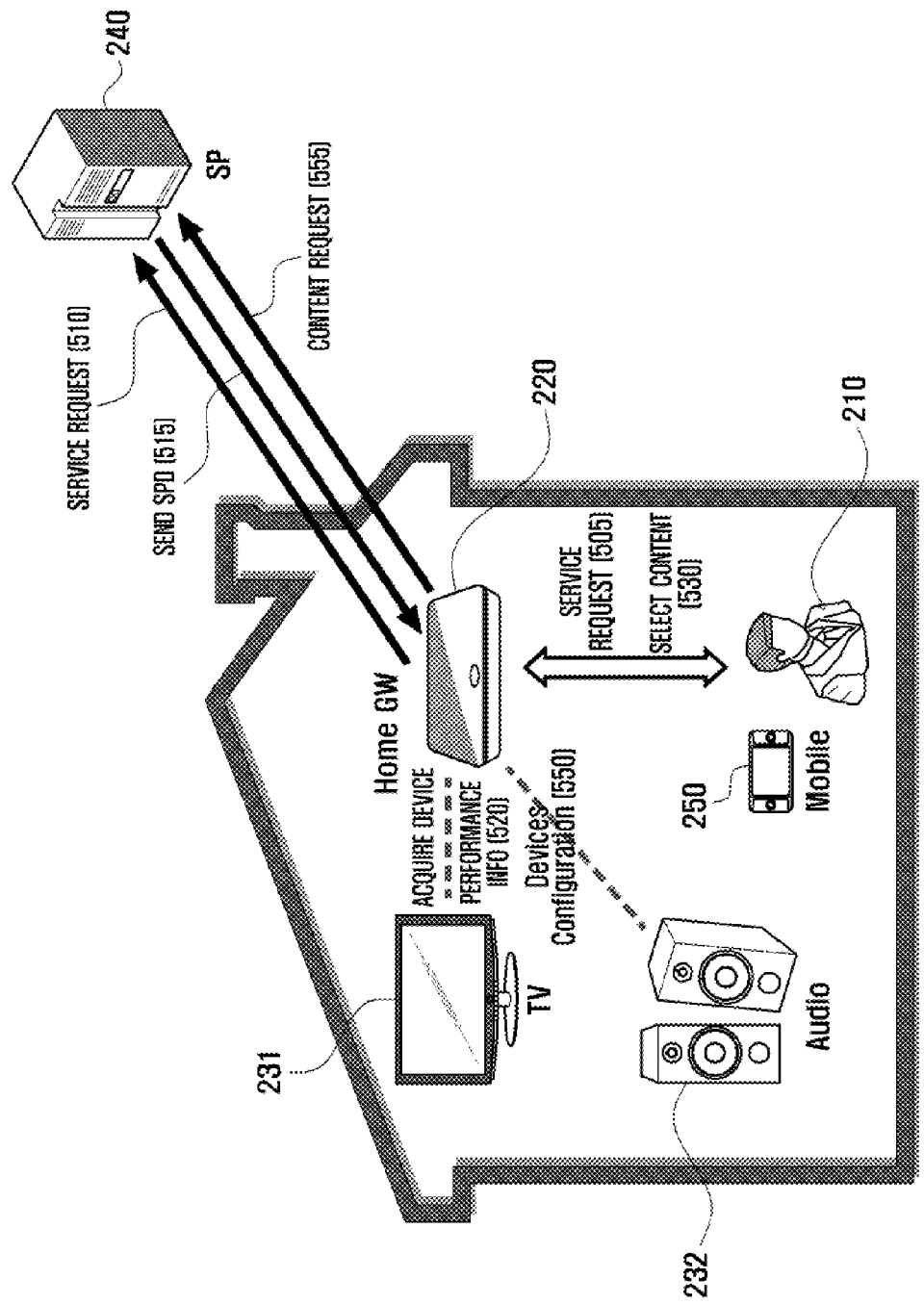
FIG. 3 is a schematic view illustrating the configuration of a system for providing a content service in accordance with an exemplary embodiment of the present invention.
Figure 4:
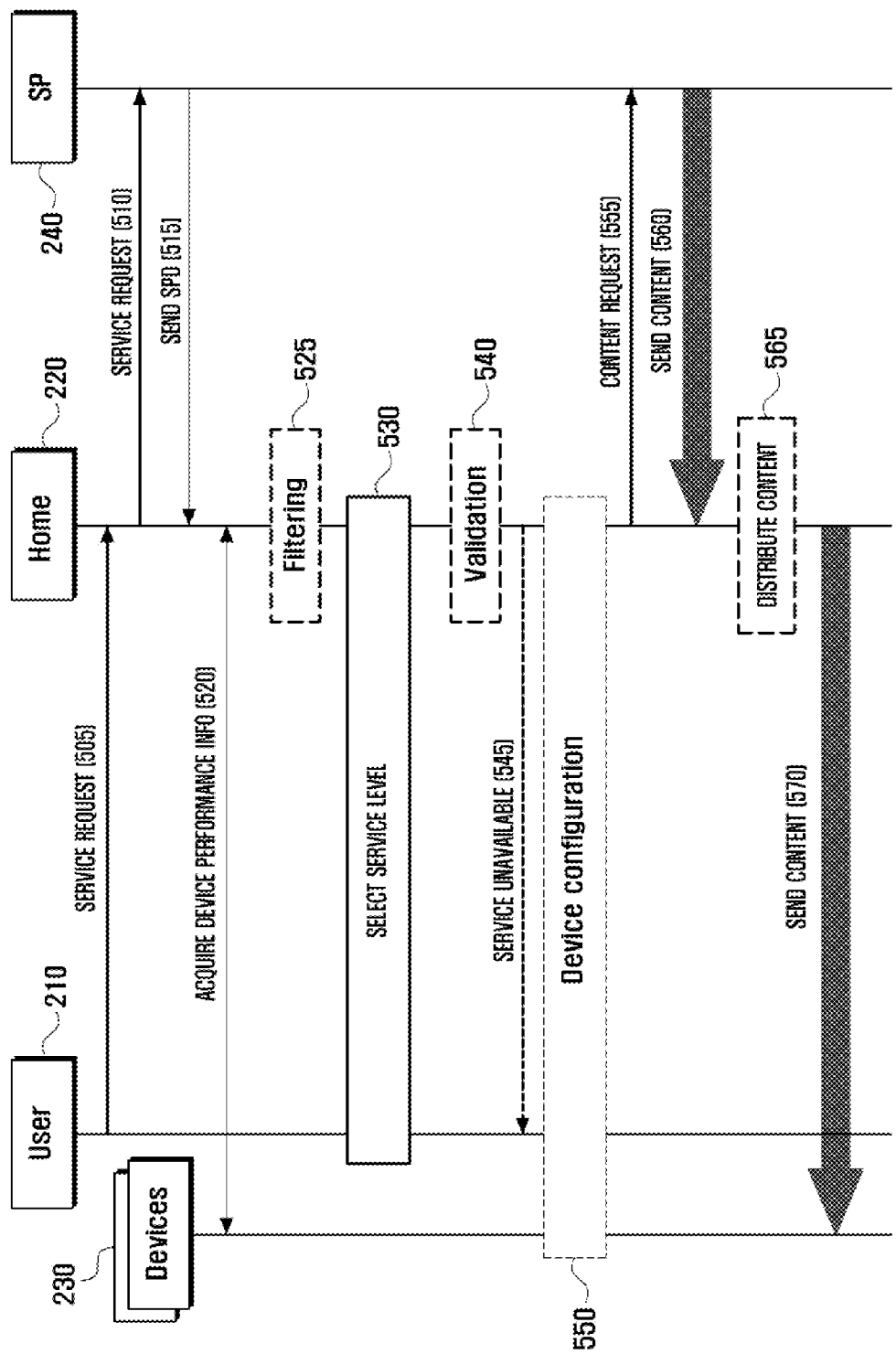
FIG. 4 is a flow diagram illustrating a method for providing a content service in accordance with an exemplary embodiment of the present invention.

FIG. 3 is a schematic view illustrating the configuration of a system for providing a content service in accordance with an exemplary embodiment of the present invention. FIG. 4 is a flow diagram illustrating a method for providing a content service in accordance with an exemplary embodiment of the present invention.

Contrary to the former exemplary embodiment shown in FIGS. 1 and 2, the exemplary embodiment shown in FIGS. 3 and 4 determines a service level of content at the home gateway 220.

Since steps 505 to 525 are substantially the same as the above-discussed steps 305 to 325 in FIGS. 1 and 2, discussion thereof will be omitted hereinafter.

In step 530, the home gateway 220 selects a service level of content on the basis of the acquired device performance information as well as service requirements of the received SPD. The home gateway 220 may offer a list of all service levels to a user through an interface so that a user can select one of the service levels. When a user selects a service level of content, the home gateway 220 may determine whether content with the selected level is available in step 540. If the present accessible devices 230 fail to satisfy the device performance required for providing a content service at the selected service level, the home gateway 220 may provide feedback indicating an unavailable service in step 545. Therefore, a user can re-select a service level of the content.

Alternatively, the home gateway 220 may select an optimal service level by itself or offer a list of service levels available for the present accessible devices 230 to a user. In either case, the above-discussed steps 540 and 545 may be unnecessary. In the former case, the home gateway 220 receives the required device performance information according to service levels as shown in Table 2 from the service provider 240 and selects the optimal service level by considering both the required performance information of the accessible device 230 and the received device performance information. The optimal service level is the highest among service levels that are supportable with the performance information of the accessible devices 230 acquired by the home gateway 220.

In step 550, the home gateway 220 creates device configuration information corresponding to the selected service level and sets up the device configuration based on the created information.

In step 555, the home gateway 220 requests content with the selected service level to the service provider 240.

Steps 560, 565 and 570 correspond to the above-discussed steps 350, 355 and 360 in FIG. 2, respectively, so discussion thereof will be omitted herein.

Although the above discussion regarding FIGS. 1 to 4 is based on the IPTV service as an example of content services, this is exemplary only and not to be considered as a limitation of the present invention. Alternatively, this invention may be applied to any other content services.

Figure 5:
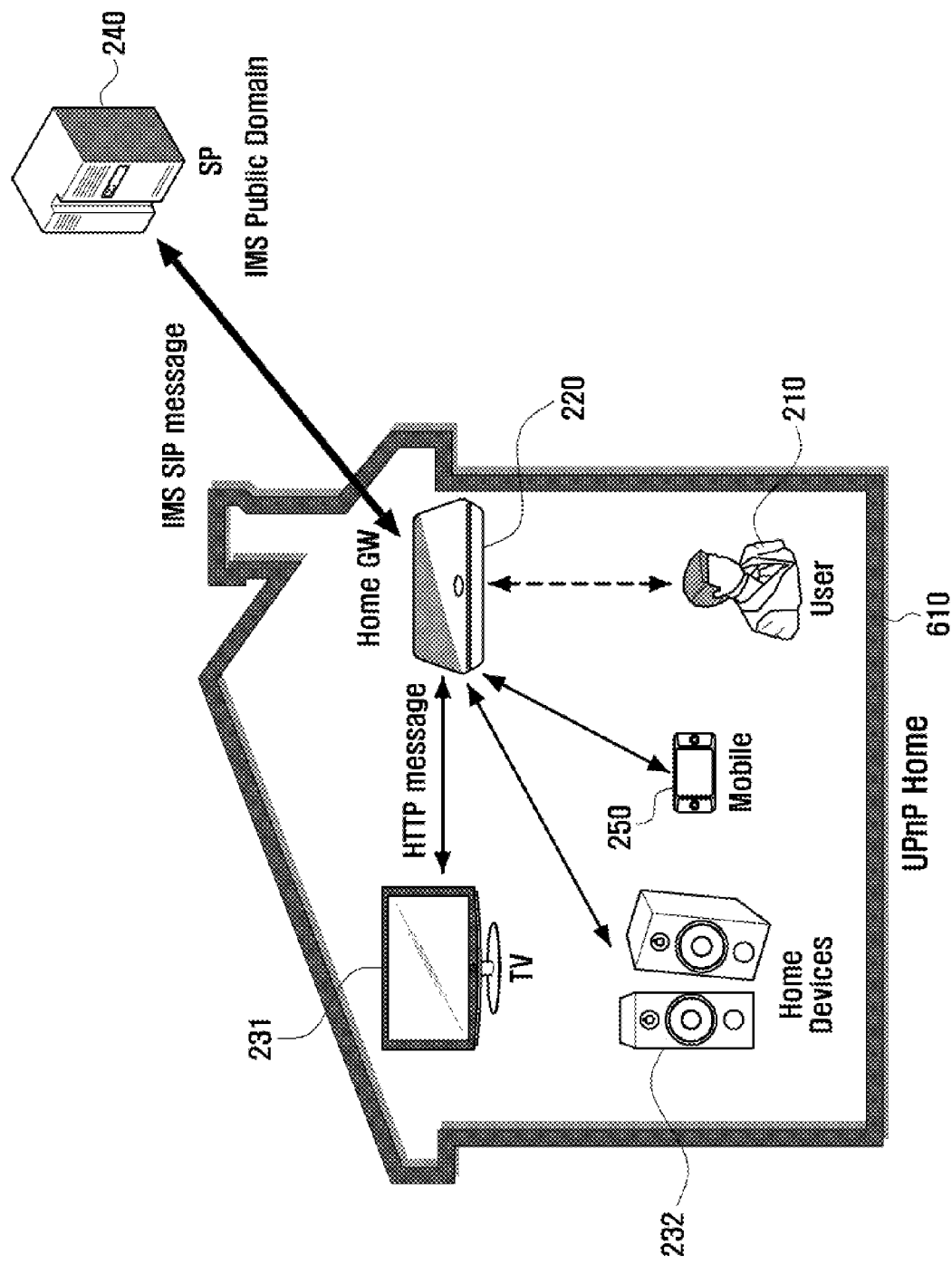
FIG. 5 is a schematic view illustrating a network in which the Open IPTV Forum (OIPF) is applied to the content service providing system shown in FIG. 1 in accordance with an exemplary embodiment of the present invention.
Figure 6:
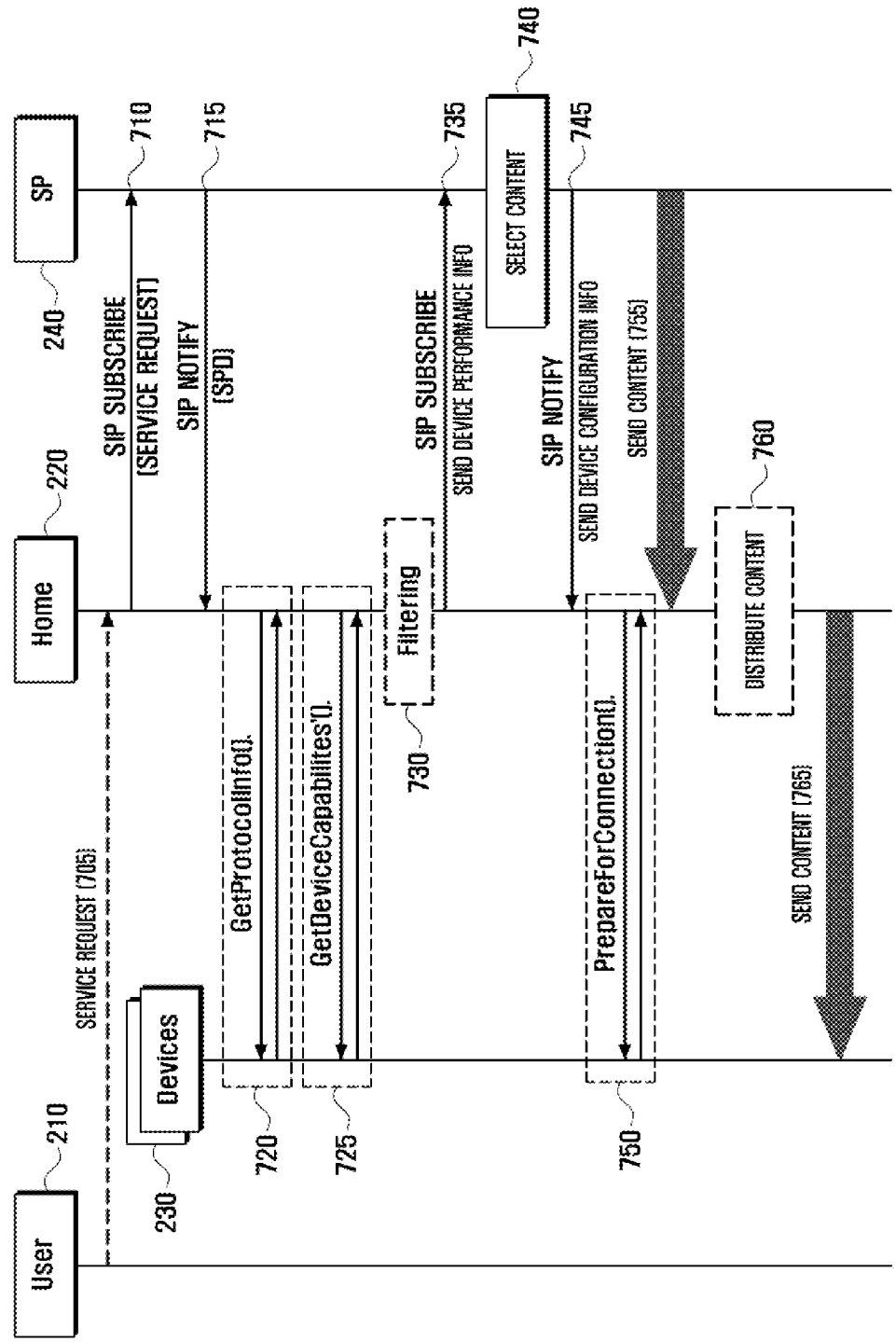
FIG. 6 is a flow diagram illustrating a process in which the Open IPTV Forum (OIPF) is applied to the content service providing method shown in FIG. 2 in accordance with an exemplary embodiment of the present invention.

FIG. 5 is a schematic view illustrating a network in which the Open IPTV Forum (OIPF) is applied to the content service providing system shown in FIG. 1 in accordance with an exemplary embodiment of the present invention. FIG. 6 is a flow diagram illustrating a process in which the Open IPTV Forum (OIPF) is applied to the content service providing method shown in FIG. 2 in accordance with an exemplary embodiment of the present invention.

According to the OIPF structure, a home network domain uses HyperText Transfer Protocol (HTTP), and Universal Plug and Play (UPnP) provides a home network service. Additionally, IP Multimedia Subsystem (IMS) based Session Initiation Protocol (SIP) is used as a protocol for a connection between a home network 610 and the service provider 240. Namely, a home domain and a public domain are separated from each other and use different protocols. This exemplary embodiment considers that HTTP-based UPnP technology is used in the home network 610.

FIG. 6 shows a service procedure using UPnP and IMS SIP on the basis of the OIPF structure in accordance with an exemplary embodiment of the present invention. Basic processes are substantially the same as those shown in FIG. 2 and are represented as an OIPF-based embodiment.

In step 705, a user sends a request for an IPTV service.

In step 710, the home gateway 220 sends an SIP SUBSCRIBE message for an IPTV service request to the service provider 240 through an IMS server (not shown).

In step 715, the service provider 240 sends an SIP NOTIFY message to the home gateway 220 in response to the SIP SUBSCRIBE message, while sending the SPD together.

In step 720, based on the received SPD, the home gateway 220 acquires protocol information of the accessible devices 230 required for the requested service through a GetProtocolInfo( ) action. The protocol information is defined in the UPnP AV service standard. One of HTTP, Real-Time Streaming Protocol/Real-time Transport Protocol/User Datagram Protocol (RTSP/RTP/UDP), International Electrotechnical Commission 61883 (IEC61883), and a specific protocol defined by a vendor may be used.

In step 725, the home gateway 220 performs a GetDeviceCapabilities( ) action to acquire the performance information of the accessible devices 230. In this step, the home gateway 220 receives the performance information corresponding to service requirements specified in the SPD from the accessible devices 230.

In step 730, the home gateway 220 performs a filtering as earlier discussed in the step 325.

In step 735, the home gateway 220 sends the acquired device performance information to the service provider 240 through the SIP SUBSCRIBE message.

In step 740, the service provider 240 selects content with an optimal service level on the basis of the device performance information received from the home gateway 220 as well as the SPD. This step corresponds to the aforesaid step 335.

In step 745, the service provider 240 sends information about the selected content and information about service configuration for playing the selected content to the home gateway 220 through the SIP NOTIFY message.

In step 750, the home gateway 220 performs a PrepareForConnection( ) action so as to establish a connection with the selected accessible devices 230 specified in the device configuration information received from the service provider 240. This process complies with the UPnP AV service standard.

In steps 755 to 765, the home gateway 220 receives the content from the service provider 240, divides the received content into parts, and sends them to proper accessible devices 230. Steps 755 to 765 correspond to the above-discussed steps 350 to 360, respectively, so discussion thereof will be omitted herein.

The above discussion is related to a case in which UPnP and IMS SIP are applied to the exemplary embodiment shown in FIGS. 1 and 2. Although not illustrated, UPnP and IMS SIP may be also applied to another embodiment shown in FIGS. 3 and 4.

Figure 7:
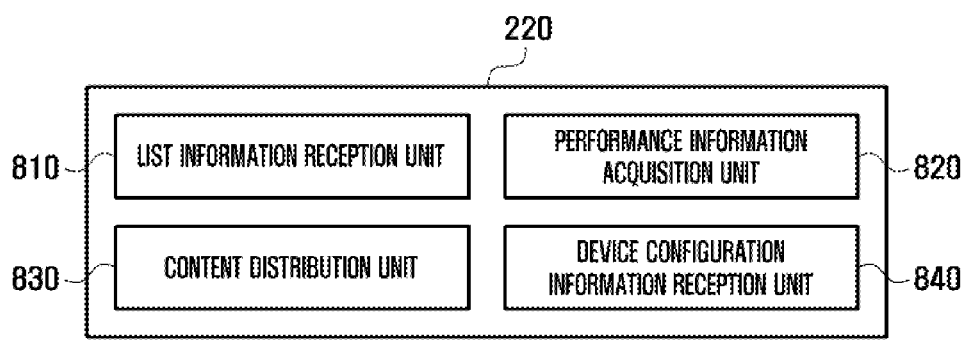
FIG. 7 is a block diagram illustrating the configuration of a gateway in accordance with an exemplary embodiment of the present invention.
Figure 8:
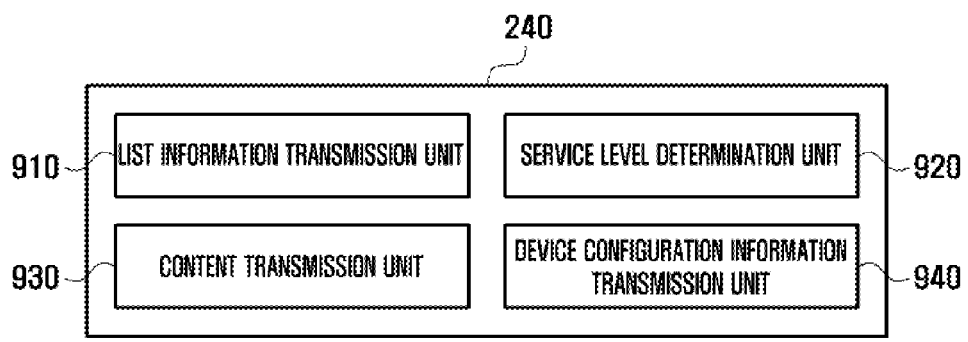
FIG. 8 is a block diagram illustrating the configuration of a service provider in accordance with an exemplary embodiment of the present invention.

FIG. 7 is a block diagram illustrating the configuration of a gateway in accordance with an exemplary embodiment of the present invention. FIG. 8 is a block diagram illustrating the configuration of a service provider in accordance with an exemplary embodiment of the present invention.

As discussed above, the home gateway 220 is a type of gateway. Hereinafter, the term 'gateway' will be used instead of 'home gateway' and a reference number 220 will be used to indicate the gateway.

FIGS. 7 and 8 respectively show the gateway 220 and the service provider 240 used for the content service providing system in the above-discussed embodiment of FIGS. 1 and 2.

Referring to FIG. 7, the gateway 220 includes a list information reception unit 810, a performance information acquisition unit 820, a content distribution unit 830, and a device configuration information reception unit 840.

Referring to FIG. 8, the service provider 240 includes a list information transmission unit 910, a service level determination unit 920, a content transmission unit 930, and a device configuration information transmission unit 940.

The list information reception unit 810 receives a request for a content service from a user and delivers it to the list information transmission unit 910 of the service provider 240. The list information transmission unit 910 receives a service request from the list information reception unit 810 of the gateway 220 and sends required list information, which is list information of devices required for the requested service, to the list information reception unit 810. Additionally, the list information reception unit 810 receives the SPD from the list information transmission unit 910. Since information contained in the SPD has been already discussed in Tables 1 and 2, the repetition of the same will be avoided herein. The SPD contains information about a list of devices required for the requested service.

The performance information acquisition unit 820 acquires the performance information of the accessible devices 230, depending on the required list information received by the list information reception unit 810.

The content distribution unit 830 sends the acquired performance information to the service provider 240. Depending on the received performance information, the service level determination unit 920 of the service provider 240 determines a service level from the highest among service levels that are supportable with the performance of the accessible devices 230. The content transmission unit 930 sends the content with the determined service level to the content distribution unit 830. Also, depending on the received performance information, the device configuration information transmission unit 940 creates device configuration information about how to distribute the content to any of the accessible devices 230, and sends it to the device configuration information reception unit 840. The content distribution unit 830 sets up the device configuration on the basis of the device configuration information received by the device configuration information reception unit 840, and distributes the received content to the respective accessible devices 230.

The above discussion about FIGS. 1 and 2 and its modification may be applied to this discussion about FIGS. 7 and 8.

Figure 9:
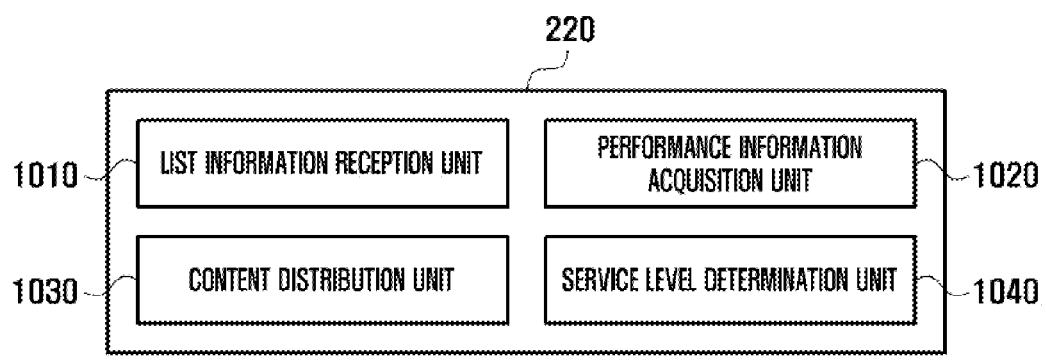
FIG. 9 is a block diagram illustrating the configuration of a gateway in accordance with an exemplary embodiment of the present invention.
Figure 10:
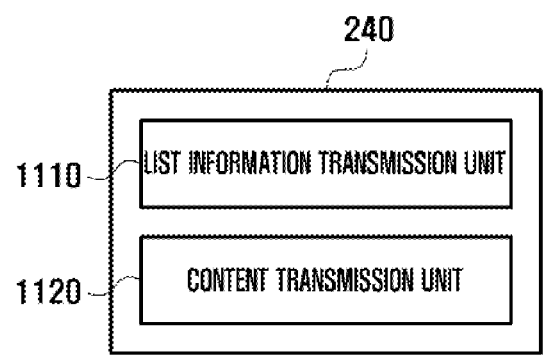
FIG. 10 is a block diagram illustrating the configuration of a service provider in accordance with an exemplary embodiment of the present invention.

FIG. 9 is a block diagram illustrating the configuration of a gateway in accordance with an exemplary embodiment of the present invention. FIG. 10 is a block diagram illustrating the configuration of a service provider in accordance with an exemplary embodiment of the present invention.

FIGS. 9 and 10 respectively show the gateway 220 and the service provider 240 used for the content service providing system in the above-discussed embodiment of FIGS. 3 and 4.

Referring to FIG. 9, the gateway 220 includes a list information reception unit 1010, a performance information acquisition unit 1020, a content distribution unit 1030, and a service level determination unit 1040.

Referring to FIG. 10, the service provider 240 includes a list information transmission unit 1110 and a content transmission unit 1120.

The list information reception unit 1010 receives a request for a content service from a user and delivers it to the list information transmission unit 1110 of the service provider 240. The list information transmission unit 1110 receives a service request from the list information reception unit 1010 of the gateway 220 and sends the SPD to the list information reception unit 1010. Since information contained in the SPD has been already discussed in Tables 1 and 2, the repetition of the same will be avoided herein. The SPD contains required list information, which is list information of devices required for the requested service, and required performance information of devices according to service levels.

The performance information acquisition unit 1020 acquires the performance information of the accessible devices 230, depending on the required list information contained in the SPD received by the list information reception unit 1010.

The service level determination unit 1040 determines a service level of content, depending on the acquired performance information and the required performance information contained in the SPD received by the list information reception unit 1010, and requests content with the determined service level to the service provider 240. An exemplary method to determine a service level of content has been already discussed in FIGS. 3 and 4. For determination of a service level, the gateway 220 may provide a user with an interface through the mobile device 250 or any other interface.

The content transmission unit 1120 sends the content with a specific service level requested by the service level determination unit 1040 to the content distribution unit 1030.

The content distribution unit 1030 creates the device configuration information, depending on both the performance information acquired by the performance information acquisition unit 1020 and the required list information of devices received from the list information transmission unit 1110, and distributes the content received from the content transmission unit 1120, depending on the device configuration information. The creation of the device configuration information and the distribution of the content have been already discussed in FIGS. 3 and 4.

The above discussion about FIGS. 3 and 4 and its modification may be applied to this discussion about FIGS. 9 and 10.

Exemplary embodiments of the present invention are described herein with reference to flowchart illustrations of user interfaces, methods, and computer program products. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order discussed. For example, two blocks shown in succession may in fact be executed substantially concurrently or the blocks may sometimes be executed in the reverse order, depending upon the functionality involved.

The term "unit", as used herein, means, but is not limited to, a software or hardware component, such as a Field Programmable Gate Array (FPGA) or an Application Specific Integrated Circuit (ASIC), which performs certain tasks. A unit may advantageously be configured to reside on the addressable storage medium and configured to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for providing a content service using multiple devices at a gateway, the method comprising:
    transmitting a service request to a service provider;
    receiving required list information, which is determined according to a service type, from the service provider receiving the service request, the required list information indicating a list of devices required for providing a requested service;
    acquiring performance information of accessible devices on the basis of the required list information, a list of accessible devices for the requested service being filtered by the gateway to remove devices with duplicative functionality beyond a number required for the requested service;
    receiving a selection of a service level from a user;
    notifying the user if the selected service level is not supported by the accessible devices based on the acquired performance information;
    receiving content including at least one audio related information and at least one video related information with a service level corresponding to the acquired performance information from the service provider;
    dividing the content into the at least one audio related information and the at least one video related information; and
    distributing the at least one audio related information to at least one audio related accessible device and the at least one video related information to at least one video related accessible device simultaneously, the at least one audio related accessible device and at least one video related accessible device being on the list,
    wherein the service type is determined based on the requested service.

2. The method of claim 1, further comprising:
    after the acquiring of the performance information,
    transmitting the acquired performance information to the service provider; and
    receiving device configuration information corresponding to the acquired performance information from the service provider,
    wherein the distributing of the received content is performed on the basis of the device configuration information.

3. The method of claim 1, further comprising:
    receiving required performance information of devices according to service levels from the service provider;
    after the acquiring of the performance information, determining a service level of the content on the basis of both the acquired performance information and the required performance information; and
    transmitting a request for the content with the determined service level to the service provider.

4. The method of claim 3, further comprising:
    generating device configuration information on the basis of both the acquired performance information and the required list information,
    wherein the distributing of the received content is performed on the basis of the device configuration information.

5. The method of claim 3, wherein the determining of the service level comprises determining the service level from the highest among service levels that are supportable with the performance of the accessible devices.

6. The method of claim 3, wherein the determining of the service level comprises:
    offering an interface for selecting one of service levels that are supportable with the performance of the accessible devices; and
    determining the service level of the content from a selected service level through the interface.

7. The method of claim 1, wherein distributing the at least one audio related information to the at least one audio related accessible device and the at least one video related information to the at least one video related accessible device simultaneously comprises distributing the at least one audio related information to a first device and the at least one video related information to a second device for a same service request, wherein the first device and the second device are separate devices.

8. A method for providing a content service using multiple devices at a service provider, the method comprising:
  transmitting required list information, which is determined according to a service type, to a gateway in response to a service request of the gateway, the required list information indicating a list of devices required for providing a requested service;
  determining a service level of content on the basis of performance information of accessible devices when receiving the performance information from the gateway, the performance information having a list of accessible devices for the requested service, the list filtered by the gateway to remove devices with duplicative functionality beyond a number required for the requested service;
  transmitting the content including at least one audio related information and at least one video related information with the determined service level to the gateway; and
  wherein the content is divided into the at least one audio related information and the at least one video related information,
  wherein the at least one audio related information is distributed to at least one audio related accessible device, and the at least one video related information is distributed to at least one video related accessible device simultaneously, the at least one audio related accessible device and at least one video related accessible device being on the list,
  wherein the service type is determined based on the requested service, and
  wherein determining the service level of content comprises:
    receiving a selection of a service level from a user, and
    notifying the user if the selected service level is not supported by the accessible devices based on the acquired performance information.

9. The method of claim 8, further comprising generating device configuration information on the basis of the received performance information, the device configuration information indicating how to distribute the at least one audio related information to the at least one audio related accessible device and the at least one video related information to the at least one video related accessible device and transmitting the device configuration information to the gateway.

10. The method of claim 8, wherein the determining of the service level comprises determining the service level from the highest among service levels that are supportable with the performance of the accessible devices.

11. A gateway for providing a content service using multiple devices, the gateway comprising:
  a list information reception unit configured to transmit a service request to a service provider, and to receive required list information, which is determined according to a service type, from the service provider, the required list information indicating a list of devices required for providing a requested service;
  a performance information acquisition unit configured to acquire performance information of accessible devices on the basis of the required list information, a list of accessible devices for the requested service being filtered by the gateway to remove devices with duplicative functionality beyond a number required for the requested service;
  a service level determination unit configured to:
    receive a selection of a service level from a user, and
    notify the user if the selected service level is not supported by the accessible devices on the basis of the acquired performance information; and
  a content distribution unit configured to:
    receive content including at least one audio related information and at least one video related information with a service level corresponding to the acquired performance information from the service provider,
    divide the content into the at least one audio related information and the at least one video related information, and
    distribute the at least one audio related information to at least one audio related accessible device and the at least one video related information to at least one video related accessible device simultaneously, the at least one audio related accessible device and at least one video related accessible device being on the list,
  wherein the service type is determined based on the requested service.

12. The gateway of claim 11, further comprising:
  a device configuration information reception unit configured to:
    transmit the acquired performance information to the service provider, and
    receive device configuration information corresponding to the acquired performance information from the service provider,
  wherein the content distribution unit distributes the received content on the basis of the device configuration information.

13. The gateway of claim 11, further comprising:
  wherein the list information reception unit receives required performance information of devices according to service levels from the service provider, and
  wherein the service level determination unit is configured to:
    determine a service level of the content on the basis of the required performance information, and
    send a request for the content with the determined service level to the service provider.

14. The gateway of claim 13, wherein the content distribution unit is further configured to generate device configuration information on the basis of both the acquired performance information and the required list information, and to distribute the received content on the basis of the device configuration information.

15. The gateway of claim 13, wherein the service level determination unit is configured to determine the service level from the highest among service levels that are supportable with the performance of the accessible devices.

16. The gateway of claim 13, wherein the service level determination unit is configured to offer an interface for selecting one of service levels that are supportable with the performance of the accessible devices, and to determine the service level of the content from a selected service level through the interface.

17. The gateway of claim 11, wherein distributing the at least one audio related information to the at least one audio related accessible device, and the at least one video related information to the at least one video related accessible device simultaneously comprises distributing the at least one audio related information to a first device and the at least one video related information to a second device for a same service request, wherein the first device and the second device are separate devices.

18. A service provider for providing a content service using multiple devices, the service provider comprising:
   a list information transmission unit configured to transmit required list information, which is determined according to a service type, to a gateway in response to a service request of the gateway, the required list information indicating a list of devices required for providing a requested service;
   a service level determination unit configured to:
   receive a selection of a service level from a user, and notify the user if the selected service level is not supported by accessible devices on the basis of performance information of the accessible devices when receiving the performance information from the gateway, the performance information having a list of accessible devices for the requested service, the list filtered by the gateway to remove devices with duplicative functionality beyond a number required for the requested service; and
   a content transmission unit configured to transmit the content including at least one audio related information and at least one video related information with the determined service level to the gateway,
   wherein the content is divided into the at least one audio related information and the at least one video related information,
   wherein the at least one audio related information is distributed to at least one audio related accessible device, and the at least one video related information is distributed to at least one video related accessible device simultaneously, the at least one audio related accessible device and at least one video related accessible device being on the list, and
   wherein the service type is determined based on the requested service.

19. The service provider of claim 18 further comprising a device configuration information transmission unit configured to generate device configuration information on the basis of the received performance information, the device configuration information indicating how to distribute the at least one audio related information to the at least one audio related accessible device and the at least one video related information to the at least one video related accessible device,
   wherein the service level determination unit is configured to determine the service level from the highest among service levels that are supportable with the performance of the accessible devices.

\* \* \* \* \*